US006368723B1

(12) United States Patent
Bouilloux et al.

(10) Patent No.: US 6,368,723 B1
(45) Date of Patent: Apr. 9, 2002

(54) FILMS COMPRISING METALLOCENE POLYETHYLENE AND POLYAMIDE

(75) Inventors: Alain Bouilloux, Bernay; Laurent Teze, Paris; Jean-Marc Andre, Evreux, all of (FR)

(73) Assignee: AtoFina, Puteaux (FR)

( * ) Notice: Subject to any disclaimer, the term of this patent is extended or adjusted under 35 U.S.C. 154(b) by 0 days.

(21) Appl. No.: 09/426,721

(22) Filed: Oct. 26, 1999

(30) Foreign Application Priority Data

Oct. 26, 1998 (FR) .............................. 98 13367

(51) Int. Cl.$^7$ ................... C08L 77/00; B32B 27/08; B32B 27/34
(52) U.S. Cl. ..................... 428/476.1; 525/184
(58) Field of Search ................ 525/184; 428/476.1

(56) References Cited

U.S. PATENT DOCUMENTS 5,707,751 A    1/1998   Garza et al. ............. 428/515
5,919,865 A    7/1999   Perret et al. ............. 525/183

FOREIGN PATENT DOCUMENTS

| EP | 0 787 761 | 8/1997 |
| EP | 0 792 740 | 9/1997 |
| WO | 95/05936 | 3/1995 |
| WO | 97/15621 | 5/1997 |
| WO | 97/28960 | 8/1997 |

*Primary Examiner*—Ana Woodward
(74) *Attorney, Agent, or Firm*—Millen, White, Zelano, & Branigan, P.C.

(57) ABSTRACT

The present invention relates to a film comprising at least one layer (A) of a mixture of polyamide and polyethylene, and optionally a layer (B) of polyethylene, such that if the polyethylene, of the layer (A) is not a metallocene polyethylene then the layer (B) is obligatory and essentially consists of metallocene polyethylene. These films are used for the moulding of polyesters, for fumigation or for the manufacture of packaging.

14 Claims, No Drawings

FILMS COMPRISING METALLOCENE POLYETHYLENE AND POLYAMIDE

The present invention relates in general to films comprising metallocene polyethylene and polyamide and uses thereof. The film may be a monolayer film or a multilayer film.

The present invention comprises a mono- or multilayer film comprising metallocene polyethylene, at least one layer (A) of a mixture of polyamide and polyethylene, and optionally a layer (B) of polyethylene, in which film the metallocene polyethylene is in the layer (A) and/or in the layer (B).

In other words, this invention comprises a film comprising at least one layer (A) of a mixture of polyamide and polyethylene, and optionally a layer (B) of polyethylene, such that if the polyethylene of the layer (A) is not a metallocene polyethylene, then the presence of the layer (B) is necessary and this layer essentially consists of metallocene polyethylene.

Film Embodiments

In a first embodiment, the film of the invention comprises at least one layer (A) of a mixture of polyamide and metallocene polyethylene.

In a second embodiment, the film of the invention comprises the above mentioned layer (A) and at least one layer (B) of polyethylene. This layer (B) is advantageously composed of metallocene polyethylene.

In a third embodiment, the film of the invention comprises a layer (A) of a mixture of polyamide and metallocene polyethylene between two layers (B) of polyethylene, where one or both may be composed of metallocene polyethylene.

In a fourth embodiment, the film of the invention comprises a layer (B) of polyethylene between two layers (A) of a mixture of polyamide and metallocene polyethylene, where the central layer (B) may be composed of metallocene polyethylene.

In a fifth embodiment, the film of the invention comprises at least one layer (A) of a mixture of polyamide and polyethylene which is not metallocene polyethylene, and at least one layer (B) of metallocene polyethylene.

In an advantageous form of this fifth embodiment of the invention, the layer (A) is arranged between two layers (B) of the metallocene polyethylene.

In another advantageous form of this fifth embodiment of the invention, the layer (A) is arranged between a layer (B) of metallocene polyethylene and another layer (B) of non-metallocene polyethylene.

In another advantageous form of this fifth embodiment, the central layer (B) of metallocene polyethylene is arranged between two layers (A).

SMC Embodiment

The films of the invention are used in SMC (sheet moulding compound) technology.

SMC is used in the manufacture of processed parts, both in the automotive sector (bumpers, hatchback doors . . . ) and in the sectors of water sports (boat hulls) and electronics (casings).

SMC is generally composed of a crosslinkable polymeric resin, in particular an unsaturated polyester, reinforcing fillers such as glass fibres, and also subordinate amounts of various other additives.

SMC is usually produced by laying down fibres on a layer of unsaturated polyester resin, this layer itself being supported on a mobile film generally composed of polyethylene or polyamide.

Another film of the same type is then laid down on the system comprising resin/reinforcing filler, to form a composite material composed of a sandwich between two films. The sandwich then traverses a series of kneading and compacting rolls and is generally wound up in the form of large rolls.

It is then stored until subsequent processing. During the period of storage the polyester resin partially crosslinks, increasing the viscosity of the SMC, until the consistency reached makes it suitable for moulding.

The users of SMCs, generally molders, cut a piece of appropriate dimensions from the roll, peel off the support film and place the SMC into a heated mold for processing and at the same time complete curing. SMC sandwich composite materials are then readily employed in procedures for compression molding.

Three properties relating to the sandwich film are of prime importance for manufacturers and users of SMCs.

The first property has regard to the permeability to styrene of the peelable film. The peelable film has to have very low permeability to styrene in order to avoid the loss of styrene monomer which acts as crosslinking agent in the SMC. This loss of styrene monomer is also harmful to the health of personnel during operations of manufacturing or storing SMC.

The second property relates to the ease of peeling this film from the polyester structure, in order that no film residues remain on the structure and in order to avoid risks associated with tearing of this film during the operations of manufacturing and processing the SMC.

Finally, the moisture uptake of these peelable films, and their permeability to water, have to be very low, so that the quality of the polyester resin, which is very sensitive to water, does not become impaired during the operations of manufacturing the SMC, of storing the polyester or of processing the SMC.

Prior Art

The prior art has described SMC films composed of blends of polyamide and polypropylene in European Patent EP 0 506 515.

The use of metallocene polyethylene is not described therein.

The films of the invention are also useful for soil fumigation. This technique consists in treating soils by injecting gas to a depth of about 0.5 or 1 m. The soil to be treated is covered with a film, so that the gas remains in the soil for a longer period, and this makes it possible to reduce the quantities of gas to be used. The prior art has described such films in EP 0 766 913.

The use of metallocene polyethylene is not described therein.

Packaging Embodiment

The films of the invention are also used for the manufacture of packaging.

The applicant has discovered that the use of metallocene polyethylene, either in the polyamide/polyethylene mixture or in the optional layer of polyethylene in a film which comprises, in addition, a layer of a mixture of polyamide and polyethylene, makes it possible to obtain good resistance to tearing and to the DART test (i.e. resistance to perforation).

The present invention also relates to packaging consisting of the films of the invention or comprising the films of the invention.

Detailed Description

The thickness of the layer (A) may be between 5 and 150 μm.

The term metallocene polyethylene denotes polymers obtained by copolymerizing ethylene and an alpha-olefin, such as propylene, butene, hexene or octene, in the presence of a monosite catalyst generally consisting of an atom of a metal which may, for example, be zirconium or titanium, and of two cyclic alkyl molecules bonded to the metal. More specifically, the metallocene catalysts are usually composed of two cyclopentadiene-type rings bonded to the metal. These catalysts are often used with aluminoxanes as cocatalysts or activators, preferably methylaluminoxane (MAO). Hafnium may also be used as a metal to which the cyclopentadiene is bound. Other metallocenes may include transition metals of groups IV A, V A and VI A. Metals of the lanthanide series may also be used.

These metallocene polyethylenes may also be characterized by their $M_w/M_n$ ratio of <3, preferably <2.

The term polyamide means a condensation product:
- of one or more amino acids, such as aminocaproic acids, 7-aminoheptanoic acid, 11-aminoundecanoic acid and 12-aminododecanoic acid or of one or more lactams, such as caprolactam, enantholactam or laurolactam;
- of one or more salts or mixtures of diamines, such as hexamethylenediamine, dodecamethylenediamine, m-xylylenediamine, bis(p-aminocyclohexyl)methane or trimethylhexamethylenediamine, with diacids, such as isophthalic, terephthalic, adipic, azelaic, suberic, sebacic or dodecanedicarboxylic acid;
- or of mixtures of one or more of these monomers, giving copolyamides.

Examples which may be mentioned are polycaprolactam (nylon-6), polylaurolactam (nylon-12) and polyhexamethyleneadipamide (nylon-6,6). Mention may be also made of copolyamides, such as nylon-6/12, derived from the condensation of caprolactam and laurolactam, and nylon-6/6,6, derived from the condensation of caprolactam, hexamethylenediamine and adipic acid. The copolyamides are of interest because their melting point is lower than that of nylon-6 or nylon-6,6, and this makes it easier to coextrude the layer (A) with the layer(s) (B).

Use is most often made of nylon-6, nylon-6,6 and nylon-6/6,6.

The term polyethylene means any polymer or copolymer comprising ethylene units and optionally other grafted or copolymerized units. Metallocene polyethylene has been defined above.

Examples which may be mentioned are:
- polyethylene and copolymers of ethylene with alpha-olefins; these products may be grafted with unsaturated carboxylic anhydrides, such as maleic anhydride, or with unsaturated epoxides, such as glycidyl methacrylate.
- copolymers of ethylene with at least one material selected from among (i) unsaturated carboxylic acids, salts of these and esters of these, (ii) vinyl esters of saturated carboxylic acids, (iii) unsaturated dicarboxylic acids and their salts, their esters, their monoesters and their anhydrides, and (iv) unsaturated epoxides.

These copolymers of ethylene may be grafted with unsaturated dicarboxylic anhydrides or with unsaturated epoxides.
- styrene-ethylene/butene-styrene (SEBS) block copolymers, optionally maleic-grafted.

It is possible to use mixtures of two or more of these polyolefins.

Use is advantageously made of:
- polyethylene,
- copolymers of ethylene and an alpha-olefin,
- copolymers of ethylene/an alkyl (meth)acrylate,
- copolymers of ethylene/an alkyl (meth)acrylate/maleic anhydride, where the maleic anhydride is grafted or copolymerized,
- copolymers of ethylene/an alkyl (meth)acrylate/glycidyl methacrylate, where the glycidyl methacrylate is grafted or copolymerized.

Examples of polymers which may be used are:
- metallocene polyethylene
- LDPE from free-radical polymerization
- high-density polyethylene, HDPE, or medium-density polyethylene, MDPE
- linear low-density polyethylene, LLDPE, or very-low-density polyethylene, VLDPE, which is a copolymer of ethylene and an alpha-olefin selected from among 1-butene, methylpentene, 1-hexene and 1-octene.

In the various embodiments of the invention, the metallocene polyethylene may be in the mixture (A) with the polyamide and/or in the layer (B). Within the scope of the invention, the metallocene polyethylene may be mixed with another polyethylene, such as an LDPE or an ethylene-alkyl (meth)acrylate copolymer. The proportion of metallocene polyethylene may be from 70 to 100 parts per 0 to 30 parts of non-metallocene polyethylene.

The mixture of polyamide and polyethylene may be in the form of two cocontinuous phases, one of polyamide and the other of polyethylene, or in the form of a matrix of polyamide in which nodules of polyethylene are dispersed.

The amount of polyamide may be between 40 and 70 parts per 30 to 60 parts of polyethylene. The melt flow index (MFI) of the polyamide may be between 3 and 40 (in g/10 min at 235° C. under 2.16 kg).

The MFI of the polyethylene may be between 0.5 and 50 (in g/10 min at 190° C. under 2.16 kg). As regards the nodules of polyethylene dispersed in the polyamide matrix, it is advisable to use a polyethylene which is more viscous than polyamide. It may be more viscous by nature, or because its viscosity is increased by crosslinking.

To promote the compatibility of the polyamide with polyethylenes, if they have little or no functionality capable of promoting compatibility, it is advisable to add a compatibilizer.

The compatibilizer is a material known per se for compatibilizing polyamides and polyethylenes. Examples which may be mentioned are:
- polyethylene, ethylene-propylene copolymers and ethylene-butene copolymers, where all of these materials are grafted with maleic anhydride or with glycidyl methacrylate.
- ethylene/alkyl (meth)acrylate/maleic anhydride copolymers, where the maleic anhydride is grafted or copolymerized,
- ethylene/vinyl acetate/maleic anhydride copolymers, where the maleic anhydride is grafted or copolymerized,
- the two abovementioned copolymers condensed with polyamides or oligomers of polyamides having only one amine end group,
- the two abovementioned copolymers (ethylene/alkyl (meth)acrylate or ethylene/vinyl acetate) in which the maleic anhydride is replaced by glycidyl methacrylate, ethylene/(meth)acrylic acid copolymers and optionally salts of these, polyethylene, polypropylene or ethylene-propylene copolymers, where these polymers are grafted with a material containing a site reactive to amines; where these graft copolymers are then condensed with polyamides or polyamide oligomers having only one amine end group.

These materials are described in patents EP 342 066 and U.S. Pat. No. 5,342,886, the content of which is incorporated in the present application.

The amount of compatibilizer depends on the number of functionalities which it carries and on the terminal functionalities of the polyamide. This amount may, for example, be from 2 to 40 parts per 100 parts of polyethylene.

The compatibilizer is advantageously selected from the class consisting of:

mixtures of polyethylene and ethylene-propylene rubber (EPR) cografted with an unsaturated carboxylic anhydride, where this cografted mixture is then optionally diluted in a polyolefin. Materials of this type are described in the patents EP 0 742 236, EP 0 802 207 and EP 0 816 067 copolymers of ethylene and an unsaturated carboxylic anhydride and optionally an ester of an unsaturated carboxylic acid or a vinyl ester of a saturated carboxylic acid.

Examples which may be mentioned of esters of unsaturated carboxylic acids are alkyl (meth)acrylates, where the alkyl radicals may have up to 24 carbon atoms.

Particular examples of alkyl acrylates or methacrylates are methyl methacrylate, ethyl acrylate, n-butyl acrylate, isobutyl acrylate and 2-ethylhexyl acrylate.

Examples of vinyl esters of saturated carboxylic acids are vinyl acetate or propionate.

Particular examples of unsaturated carboxylic anhydrides are maleic anhydride, itaconic anhydride, citraconic anhydride and tetrahydrophthalic anhydride.

In a preferred embodiment of the invention, the compatibilizer is a copolymer of ethylene, alkyl (meth)acrylate and maleic anhydride. The proportions by weight of the various monomers are, respectively, from 50 to 94.8, from 5 to 40 and from 0.2 to 10, and the MFI may be between 2 and 15 (in g/10 min at 190° C. under 2.16 kg).

The proportions of polyamide, polyethylene and compatibilizer are, respectively, from 40 to 70, from 30 to 60 and from 0 to 20 (the total being 100).

The mixture of the layer (A) may be prepared by the usual techniques of mixing thermoplastic melts, for example in BUSS mixers or single- or twin-screw extruders. It would not constitute a departure from the scope of the invention to add antioxidants, UV stabilizers, slip agents, fillers, etc. The film may be produced by blown-film extrusion or extrusion through a slot die.

The polyethylene of the layer (B) may be selected from among the polyethylenes mentioned above for (A).

The optional layer of polyolefin (B) may have a thickness of from 5 to 150 $\mu$m.

The film consisting of the layers (A) and (B) may be produced by blown-film coextrusion or coextrusion through slot dies.

Depending on the application or the properties required, it may be necessary to arrange a binder between the layers (A) and (B).

Examples of binders which may be mentioned are:

polyethylene, polypropylene, copolymers of ethylene and at least one alpha-olefin, and mixtures of these polymers, where all of these polymers are grafted with unsaturated carboxylic anhydrides, such as maleic anhydride. It is also possible to use mixtures of these grafted polymers with these ungrafted polymers.

copolymers of ethylene with at least one material selected from among (i) unsaturated carboxylic acids, salts of these and esters of these, (ii) vinyl esters of saturated carboxylic acids, (iii) unsaturated dicarboxylic acids and their salts, their esters, their monoesters and their anhydrides, and (iv) unsaturated epoxides; where these copolymers may be grafted with unsaturated dicarboxylic anhydrides, such as maleic anhydride, or unsaturated epoxides, such as glycidyl methacrylate.

It is also possible to add, to one layer or to each of the layers, a material which improves their adhesion, without the necessity of using a layer of binder. This material may be the abovementioned binder.

Examples of binders are described in patents EP 802207, EP 816460, EP 816067, EP 837080 and EP 742236.

In the first embodiment of the invention, the thickness is advantageously between 30 and 80 $\mu$m for a film used for fumigation or for SMC.

In the second to fifth embodiments of the invention, the thickness of the layer(s) (A) is advantageously from 5 to 50 $\mu$m, and that of the layer(s) (B) is advantageously from 5 to 80 $\mu$m.

EXAMPLES

The materials used in the examples are as follows:

Nylon-6: nylon-6 with an MFI of 20 (in g/10 min at 235° C. under 2.16 kg)

LLDPE 7209AA: linear low-density polyethylene, a copolymer of ethylene and 4-methyl-1-pentene with an MFI of 0.9 g/10 min and a density of 0.920

LDPE FE 8000: polyethylene prepared by free-radical polymerization, with a density of 0.924 and an MFI of 0.8

LDPE 1003 FN23: polyethylene prepared by free-radical polymerization, with a density of 0.923 and an MFI of 0.3

Engage 8150: metallocene polyethylene with a density of 0.87 and an MFI of 0.5 (ASTM D—1238)

Clearflex FFDO: polyethylene with a density of 0.9 and an MFI of 0.8

Exceed ECD 103: gas-phase-process metallocene polyethylene with a density of 0.917 and an MFI of 1 (ASTM D—1238)

Dowlex 2045: linear low-density polyethylene with a density of 0.919 and an MFI of 0.97

Lotader 3210: copolymer of ethylene, butyl acrylate and maleic anhydride in proportions by weight of 91, 6 and 3 and with an MFI of 5 (190° C.—2.16 kg)

Lotader 3410: copolymer of ethylene, butyl acrylate and maleic anhydride in proportions by weight of 79, 18 and 3 and with an MFI of 5 (190° C.—2.16 kg)

Anti 51: denotes IRGANOX 1098 from CIBA SPECIALITY (antioxidant)

Anti 82: denotes HOSTANOX PAR 24 from HOECHST (antioxidant)

LE 6000: denotes a blend of 65% of nylon-6, 25% of PE 7209AA and 10% of Lotader 3210.

The compositions by weight of various mixtures (A) of polyamide and polyolefin are given in Table 1. The mixtures were manufactured in a WERNER 40 extruder, and films of 50 μm thickness were then prepared with the aid of a KAUFMAN blown-film extruder. The results are in Table 2. Tables 3 and 4 relate to multilayer films.

The following methods were used to determine the values in these tables:

DART test: NFT 54109 A and B

Gloss: a 50 μm film is placed on a black foam (gloss 0%) and the angle for measurement is 60° C. The value should be as high as possible Tension: ISO 527, 15 mm strip, pull rate 500 mm/min Tear: NFT 54–141

Haze: denotes the inverse of translucency; should be as high as possible.

Table 3 relates to three-layer films consisting of a central layer (A) composed of polyamide and non-metallocene polyethylene between two layers of either low-density polyethylene or metallocene polyethylene.

Table 4 relates to films similar to those of Table 3, but a layer of coextrusion binder has been arranged between the central layer (A) and each outer layer of polyethylene. The binder used is OREVAC® 18302 from ELF ATOCHEM, i.e. a mixture of LLDPE and EPR in proportions by weight of 75 and 25 cografted with 0.4% of maleic anhydride and having an MFI of 1 (190° C.—2.16 kg).

TABLE 1

| Examples | 1 | 2 | 3 | 4 | 5 |
|---|---|---|---|---|---|
| Nylon-6 | 65 | 65 | 65 | 65 | 65 |
| PE FE 8000 | 25 | | | | |
| PE 1003 FE 23 | | 25 | | | |
| PE 7209 AA | | | 25 | | |
| PE Clearflex FFDO | | | | 25 | |
| PE Engage 8150 | | | | | 25 |
| Lotader 3410 | 10 | 10 | 10 | 10 | 10 |
| Anti 51 | 0.5 | 0.5 | 0.5 | 0.5 | 0.5 |
| Anti 82 | 0.2 | 0.2 | 0.2 | 0.2 | 0.2 |

TABLE 2

| 50 μm film examples | Dart test Weight in grams | Dart test Method | Gloss % | Gloss std. dev. | Longitudinal F breaking in MPa | Longitudinal std. dev. | Longitudinal Elongation at break in % | Longitudinal std. dev. | Transverse F breaking in MPa | Transverse std. dev. | Transverse Elongation at break in % | Transverse std. dev. | Tear Longitudinal Force in cN | Tear Longitudinal std. dev. | Tear Transverse Force in cN | Tear Transverse std. dev. | Haze % | Haze std. dev. |
|---|---|---|---|---|---|---|---|---|---|---|---|---|---|---|---|---|---|---|
| 1 | 147.5 | A | 29.3 | 0.2 | 54.5 | 3.9 | 437 | 34 | 38.8 | 1.4 | 437 | 15 | 25.6 | 8.3 | 246.4 | 16.7 | 29.3 | 0.9 |
| 2 | 168 | A | 37.0 | 0.9 | 51.8 | 2.4 | 487 | 32 | 39.1 | 2.5 | 480 | 23 | 36.2 | 5.4 | 174.4 | 28.3 | 35.5 | 0.3 |
| 3 | 517 | B | 47.2 | 0.4 | 61 | 5 | 554 | 38 | 44 | 2.0 | 558 | 27 | 42 | 5.0 | 115 | 11 | 24.2 | 0.6 |
| 4 | 720 | B | | | 51 | 3 | 482 | 35 | 44 | 3.0 | 565 | 35 | 61 | 14 | 240 | 42 | | |
| 5 | 1061 | B | 55.1 | 3.2 | 54 | 4 | 469 | 32 | 43 | 3.0 | 608 | 97 | 64 | 11 | 354 | 16 | 41.7 | 0.4 |

TABLE 3

| (B)/(A)/(B) example | | ISO 527 TENSION 15 mm strip, 500 mm/min pull rate longitudinal Av. | ISO 527 TENSION longitudinal std dev. | ISO 527 TENSION transverse Av. | ISO 527 TENSION transverse std. dev. | NFT-54-141 tear longitudinal Av. cN | NFT-54-141 tear longitudinal std. dev. | NFT-54-141 tear transverse Av. cN | NFT-54-141 tear transverse std. dev | DART TEST Method used | DART TEST Weight (in g) at 50% failure |
|---|---|---|---|---|---|---|---|---|---|---|---|
| 6 | | | | | | | | | | | |
| 1003FE23/ | Yield stress (MPa) | 16.8 | 0.7 | 17 | 1 | 0 | 0 | 63 | 15 | A | 152 |
| LE6000/ | Elongation at yield (%) | 24.1 | 1.3 | 16 | 1 | | | | | | |
| 1003FE23 | Breaking stress (MPa) | 39 | 1.6 | 28 | 1.1 | | | | | | |
| thickness: | Elongation at break (%) | 425 | 27 | 560 | 15 | | | | | | |
| 10/10/10 μm | | | | | | | | | | | |
| 7 | | | | | | | | | | | |
| ECD 103/ | Yield stress (MPa) | 16.1 | 0.2 | 15.5 | 0.5 | 57 | 27 | 95 | 14 | A | 236 |
| LE6000/ | Elongation at yield (%) | 24.7 | 1 | 19.5 | 0.9 | | | | | | |
| ECD 103 | Breaking stress (MPa) | 38 | 3 | 38 | 1 | | | | | | |
| thickness: | Elongation at break (%) | 440 | 34 | 660 | 20 | | | | | | |
| 10/10/10 μm | | | | | | | | | | | |

TABLE 4

| (B)/binder/(A)/binder/(B) examples | | ISO 527 TENSION 15 mm strip, 500 mm/min pull rate | | | | NFT-54-141 tear | | | | DART TEST | |
|---|---|---|---|---|---|---|---|---|---|---|---|
| | | longitudinal | | transverse | | longitudinal | | transverse | | | |
| | | Av. | std dev. | Av. | std. dev. | Av. cN | std. dev. | Av. cN | std dev | Method used | Weight (in g) at 50% failure |
| 8 | | | | | | | | | | | |
| 1003FE23/ 18302/LE6000/ 18302/1003FE23 thicknesses: 7/3/10/3/7 (μm) | Yield stress Elongation at yield Breaking stress Elongation at break | 12 23 26 385 | 1 1 2 28 | 10 18 15 354 | 1 1 2 97 | 8 | 3 | 108 | 7 | A | 203 |
| 9 | | | | | | | | | | | |
| ECD103/ 18302/LE6000/ 18302/ECD 103 thicknesses: 7/3/10/3/7 (μm) | Yield stress Elongation at yield Breaking stress Elongation at break | 11 23 23 442 | 0 1 2 27 | 11 23 22 499 | 0 1 1 11 | 56 | 7 | 112 | 14 | A B | >392 >321 |
| 10 | | | | | | | | | | | |
| ECD 103/ 18302/LE 6000/ 18302/ECD 103 thicknesses: 12/3/4/3/6 (μm) | Yield stress Elongation at yield Breaking stress Elongation at break | 10 23 18 445 | 1 1 2 43 | 9 23 22 655 | 0 1 2 51 | 145 | 26 | 127 | 12 | A B | >392 g >321 g |
| 11 | | | | | | | | | | | |
| 2045E/18302/ LE6000/ 18302/2045E thicknesses: 12/3/4/3/6 (μm) | Yield stress Elongation at yield Breaking stress Elongation at break | 12 24 20 440 | 1 1 2 35 | 9 19 15 523 | 1 2 2 67 | 75 | 4 | 100 | 15 | A | 315 g |

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 98/13367, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A metallocene polyethylene-containing mono- or multilayer film comprising at least one layer (A) which comprises a mixture of a polyamide and a polyethylene, and optionally at least one layer (B) comprising a polyethylene, in which film the metallocene polyethylene is contained in at least one layer (A) or layer (B).

2. Film according to claim 1, comprising at least one layer (A) consisting essentially of a mixture of polyamide and metallocene polyethylene.

3. Film according to claim 2, comprising, in addition, a layer (B) of polyethylene.

4. Film according to claim 3, wherein layer (B) comprises mettallocene polyethylene.

5. Film according to claim 2, in which film the polyamide of the layer (A) is nylon-6 or nylon 6,6.

6. Film according to claim 1, comprising at least one layer (A) of a mixture of polyamide and metallocene polyethylene, between two layers (B) of polyethylene.

7. Film according to claim 6, wherein at least one layer (B) comprises metallocene polyethylene.

8. Film according to claim 7, wherein both layers (B) comprises metallocene polyethylene.

9. Film according to claim 1, comprising at least one layer (B) of polyethylene between two layers (A) of a mixture of polyamide and metallocene polyethylene.

10. Film according to claim 9, wherein the central layer (B) comprises metallocene polyethylene.

11. Film according to claim 1, comprising at least one layer (A) of a mixture of polyamide and polyethylene which is not metallocene polyethylene, and at least one layer (B) of metallocene polyethylene.

12. Film according to claim 1, in which film the polyamide of the layer (A) is nylon-6 or nylon 6,6.

13. A layer comprising film-forming polymers and optional additives, said film-forming polymers consisting essentially of a mixture of polyamide and metallocene polyethylene.

14. A layer comprising film-forming polymers and optional additives, said film-forming polymers consisting of a mixture of polyamide and metallocene polyethylene.

* * * * *

UNITED STATES PATENT AND TRADEMARK OFFICE
CERTIFICATE OF CORRECTION

PATENT NO.    : 6,368,723 B1
DATED         : April 9, 2002
INVENTOR(S)   : Bouilloux et al.

It is certified that error appears in the above-identified patent and that said Letters Patent is hereby corrected as shown below:

<u>Title page,</u>
Item [73], please change "AtoFina" to -- ATOFINA --.

Signed and Sealed this

Fifth Day of August, 2003

JAMES E. ROGAN
*Director of the United States Patent and Trademark Office*